United States Patent
Koski

(10) Patent No.: US 8,719,283 B2
(45) Date of Patent: May 6, 2014

(54) SUMMARIZING REVIEWS

(75) Inventor: David A. Koski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 11/541,070

(22) Filed: Sep. 29, 2006

(65) Prior Publication Data

US 2008/0082499 A1     Apr. 3, 2008

(51) Int. Cl.
*G06F 7/04* (2006.01)
*G06F 17/30* (2006.01)

(52) U.S. Cl.
USPC ........... 707/750; 707/603; 707/688; 707/722; 707/748

(58) Field of Classification Search
USPC ........ 707/1, 2, 3, 104.1, 7, 999.001, 999.002, 707/999.003, 999.007, 999.104, 603, 688 707/722, 748, 750, 999.107
See application file for complete search history.

(56) References Cited

U.S. PATENT DOCUMENTS

| | | | |
|---|---|---|---|
| 5,845,278 A * | 12/1998 | Kirsch et al. | 707/688 |
| 7,620,651 B2 * | 11/2009 | Chea et al. | 1/1 |
| 2002/0184108 A1 | 12/2002 | Hatakama et al. | |
| 2003/0158844 A1 | 8/2003 | Kramer et al. | |
| 2006/0143158 A1 * | 6/2006 | Ruhl et al. | 707/3 |
| 2007/0078833 A1 * | 4/2007 | Chea et al. | 707/3 |
| 2008/0109232 A1 * | 5/2008 | Musgrove et al. | 705/1 |
| 2009/0070101 A1 * | 3/2009 | Masuyama et al. | 704/9 |
| 2011/0125736 A1 * | 5/2011 | Dave et al. | 707/723 |

OTHER PUBLICATIONS

Ask E.T.: Sparklines: theory and practice 2006: http://www.edwardtufte.com/bboard/q-and-a-fetch-msg?msg_id=0001OR&topic_id&topic=.
Fum, Danilo, "Forward and Backward Reasoning in Automatic Abstracting", pp. 83-88.
Redfern, Darren M., "Natural Language Meta-Search System and Method", pp. 1-35.
Salton, Gerard, "Approaches to Passage Retrieval in Full Text Information Systems", pp. 49-58.
Sumita, Kazuo, "Document Detection System with Improved Document Detection Efficiency", pp. 1-142.
Weeks, Richard, "Method and Apparatus for Creating a Customized Summary of Text by Selection of Sub-Sections Thereof Ranked by Comparison to Target Data Items", pp. 1-28.
Zechner, Klaus, "Automatic Text Abstracting by Selecting Relevant Passages", pp. 1-79.

* cited by examiner

*Primary Examiner* — Bruce Moser
(74) *Attorney, Agent, or Firm* — Novak Druce Connolly Bove + Quigg LLP

(57) ABSTRACT

Summarizing a set of reviews is disclosed. In some embodiments, a set of reviews is analyzed, e.g., by an at least partially automated process. A summary of the information included in the set of reviews is provided. The summary includes a visual indication of a range and distribution of opinions expressed in the set of reviews. In some embodiments, the set of reviews includes reviews from one or more members of an online or other user community, such as customers of an online store, subscribers to a podcast, blog, or other online source of content, etc.

21 Claims, 4 Drawing Sheets

SUMMARIZING REVIEWS

BACKGROUND OF THE INVENTION

A user considering a set of reviews typically has to go through a large number of reviews to gain a sense of the topics addressed, range of opinions expressed, and/or trends revealed by the set of reviews. An average rating associated with a set of reviews may be provided. However, such an average rating statistic does not provide information about the content of the reviews and does not provide adequate information on the distribution of ratings associated with the set of reviews. For example, if the ratings of a set of reviews are primarily one star or five stars on a five star scale, an average three star rating may be indicated for the set of reviews. Such an average, however, conveys very little information about the actual views expressed in the set of reviews, which in this example are very polarized. That is, reviewers either loved the review item or hated; a range and distribution of views not captured by the average of three stars.

Thus, there is a need for an improved manner to summarize the information, opinions, and trends expressed and/or revealed in a set of reviews.

BRIEF DESCRIPTION OF THE DRAWINGS

Various embodiments of the invention are disclosed in the following detailed description and the accompanying drawings.

DETAILED DESCRIPTION

Figure 1:
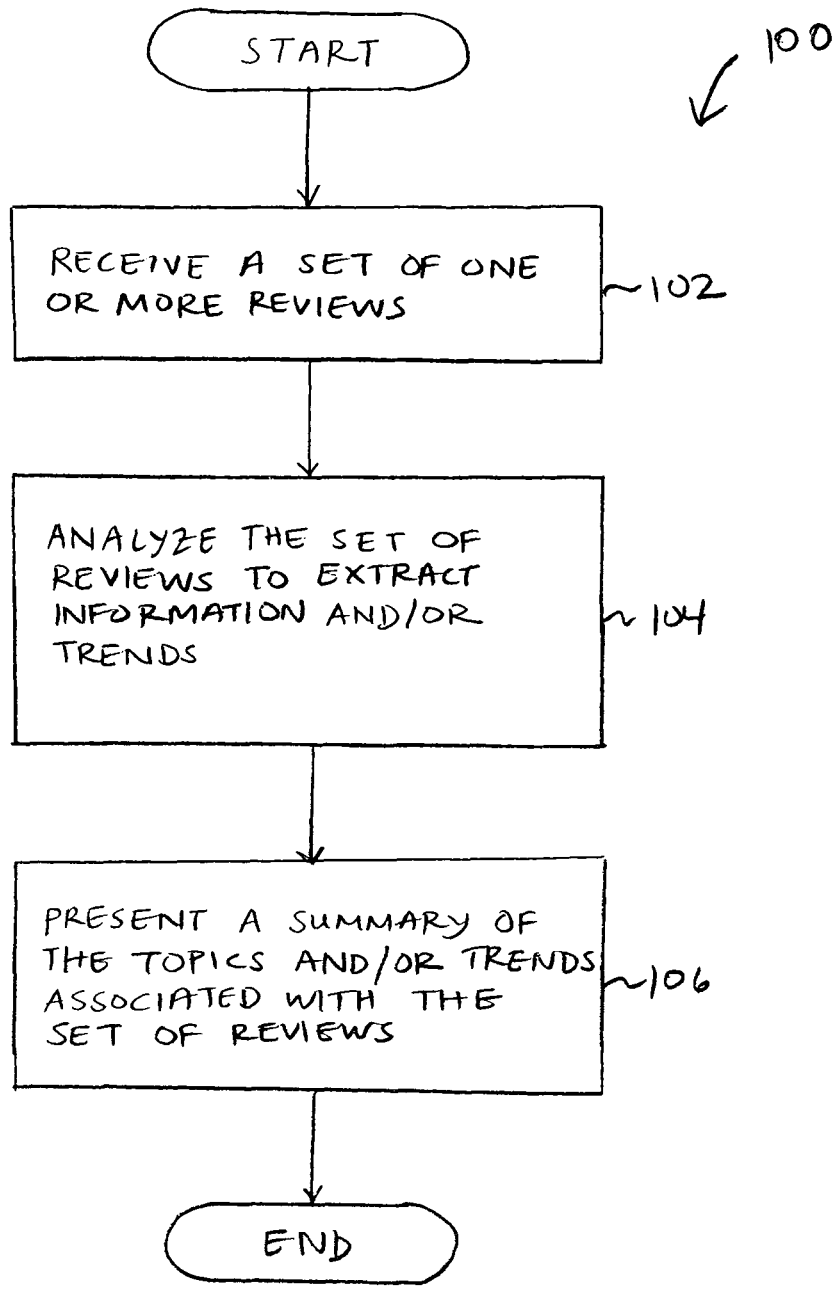
FIG. 1 illustrates an embodiment of a process for analyzing and presenting the information included in and/or trends associated with a set of reviews.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Summarizing a set of reviews is disclosed. In some embodiments, a set of reviews is analyzed, e.g., by an at least partially automated process. A summary of the information included in the set of reviews is provided. The summary includes a visual indication of a range and distribution of opinions expressed in the set of reviews. In some embodiments, the set of reviews includes reviews from one or more members of an online or other user community, such as customers of an online store, subscribers to a podcast, blog, or other online source of content, etc.

Providing a summary that enables a user to obtain quickly and in a concise form a sense of the opinions expressed and/or trends represented by a set of reviews is disclosed. In some embodiments, an interface is provided to enable a user to identify and/or access a subset of reviews of particular interest to the user without having to sift through the set of reviews to find the reviews of interest to the user. In various embodiments, the reviews are categorized or indexed so that a user can identify and/or access quickly a subset of reviews of interest to the user, to determine the range and distribution of the ratings (or other measures of opinion) associated with the set of reviews, to correlate the distribution of the ratings with the content of the reviews, etc. While many of the examples described in detail herein are with respect to a set of reviews associated with an item and that is available on a particular web site such as an online store, the techniques described herein may be similarly employed to summarize the content and/or trends associated with a set of reviews on any topic or idea and in any context. For example, the techniques described herein may be used with respect to a set of reviews directed towards any topic, idea, item, product, publication, person, organization, technology, multimedia content, etc., and may be available at a physical store, in a publication or periodical, on a television show, on an online website or store, etc.

FIG. 1 illustrates an embodiment of a process for analyzing and presenting the information included in and/or trends associated with a set of reviews. Process 100 starts at 102 at which a set of one or more reviews is received. The set of reviews received at 102 may be associated with any type of item or content and may be received from any medium. In various embodiments, the set of reviews may be associated with a product or item under consideration and/or available at a store (e.g., an online store), a recommended set of items, a comparison of a set of similar and/or interchangeable items, etc. At 104, the set of reviews received at 102 is analyzed to extract information, opinions, and/or trends indicated by the set of reviews and/or respective individual reviews included therein. In some embodiments, 104 includes mining the content of the reviews via an at least partly automated process. In some embodiments, a set of words included in a stop list, such as words that may invariably be used in any review of an item (e.g., the name of the item) and thus do not convey a sense or gist of a review, are discarded, and tuples of words that are not included in such a stop list are extracted from the set of reviews. In some embodiments, a relevance score is determined for each tuple of words extracted from the set of reviews. In various embodiments, the relevance score of a tuple of words may at least in part be based on the number of reviews in the set of reviews in which the tuple is included; the frequency of repetition of the tuple in the reviews that include the tuple; the spacings (i.e. distances) between various words in a tuple, if the tuple is comprised of a plurality of words, in the reviews that include the tuple; corresponding usefulness scores (which, for example, may be based on user voting) associated with the reviews that include the tuple and/or the tuple and/or a tag or keyword derived therefrom; etc. In some embodiments, a particular tuple is associated with multiple tuples that include various permutations of the same root words. In some embodiments, if too broad a set of tuples is extracted from a set of reviews, the maximum number of words that can be included in a tuple may be limited to reduce the size of the set of tuples. Any appropriate technique such as identifying frequently repeated word sequences, text summarization techniques, text clustering, natural language processing, etc., may be employed at 104 to analyze the content of the set of reviews. In some embodiments, a set of one or more tuples, terms, and/or topics (collectively referred to as "keywords" in some embodiments herein) are selected to be associated with the set of reviews. In some embodiments, the selections of keywords are based at least in part on relevance scores associated with the keywords. In some embodiments, the keywords selected to be associated with a set of reviews are used to categorize the set of reviews, for example, into subsets. In various embodiments, 104 includes one or more of the following: analyzing ratings provided by reviewers with their associated reviews, such as ratings on a scale of one to five stars, etc.; determining various statistics associated with and/or the distribution of the ratings of the set of reviews; correlating keywords used to categorize the set of reviews with the ratings associated with the set of reviews; analyzing trends in the set of reviews over time; and taking the usefulness scores associated with the various reviews into consideration. In some embodiments, reviews may be associated with weightings based on their usefulness scores (e.g., reviews with higher usefulness scores may have higher weightings), and such weightings may affect the effects the content and/or ratings of reviews have on the analysis relative to those of other reviews in the set of reviews.

Based upon the analysis of the set of reviews at 104, a summary of the topics, range and distribution of opinions, and/or trends associated with the set of reviews is presented at 106, after which process 100 ends. In some embodiments, the summary presented at 106 includes a visual indication of the range and distribution of opinions expressed in the set of reviews. In some embodiments, the distribution of opinions along one or more axes or dimensions is presented, e.g., user and/or reviewer demographics (urban versus rural reviewer, male versus female, etc.); use (e.g., in an urban versus rural application or setting); extracted keyword(s) (e.g., reviews associated with keyword "classical" expressed a favorable opinion of a reviewed stereo component whereas reviews associated with the keyword "hip hop" did not); and topic/theme (e.g., reviews of a movie that included the word "violent" expressed negative opinions whereas those that mentioned "action" more often expressed favorable views). In some embodiments, keywords used to provide a sense of the content and/or the range and distribution of opinions expressed in a set of reviews are presented at 106 in a "themes" or "hot topics" section associated with the set of reviews. In some embodiments, the keywords are sorted for presentation based on their associated relevance scores, for example, from highest to lowest. In online contexts, in some embodiments, each keyword may comprise a link that a user can click on to view a subset of reviews that include the keyword, content associated with the keyword, and/or a visual indication of a range and/or distribution of opinions that shows how reviews associated with the keyword compared to other reviews, e.g., reviews associated with a keyword determined to bear some relationship to the keyword. For example, in some embodiments if some reviews mention "urban" (and/or "city", etc.) frequently and others mentioned "rural" (and/or "country", "farm", etc.), a visual indication may be provided that shows how the range and distribution of opinions expressed in the "urban" reviews compares to those expressed in the "rural" reviews. Such information would enable a user to identify quickly those reviews most relevant to the user, e.g., based on whether the user considers himself or herself to be an urban or rural user. In some embodiments, the keywords to be associated with a set of reviews are hierarchically categorized, so that, for example, when a particular keyword is selected one or more other keywords categorized under that keyword are presented to a user for further consideration so that the user can navigate to a more directed subset of reviews. In some embodiments, the set of reviews are categorized into positive and negative review subsets, for example, based on the ratings associated with the reviews. In various embodiments, the set of reviews may be organized or sorted in various manners or may be selected by a user to be organized or sorted in a desired manner. For example, the set of reviews may be sorted chronologically (e.g., newest to oldest), by reviewer specified ratings (e.g., five stars to one star in a five star rating system), by associated keywords (e.g., highest relevance score to lowest, alphabetically, etc.), by reviewer name (e.g., alphabetically), by the usefulness scores associated with the reviews, etc.

In some embodiments, the distribution of the ratings associated with the set of reviews is presented in graphical form at 106, for example, via a spark line or other visual representation. In some embodiments, the distribution of ratings and/or a graphical representation of the distribution of ratings is associated with one or more of the keywords selected to be associated with the set of reviews so that information about which keywords are used most often when particular ratings are selected by reviewers can be succinctly presented.

Figure 2:
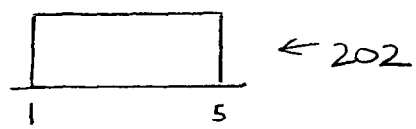
FIG. 2 illustrates examples of graphical indicators that can be employed to represent the distribution of the ratings of a set of reviews.
Figure 2:
Figure 2:
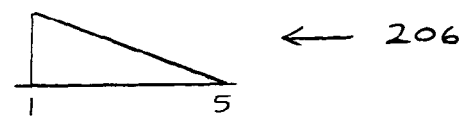
Figure 2:
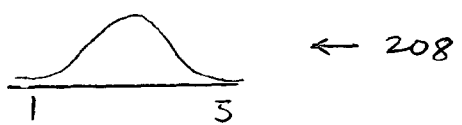
Figure 2:
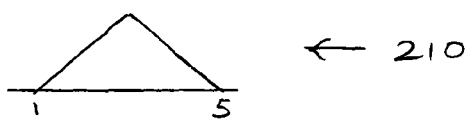
Figure 2:

FIG. 2 illustrates examples of graphical indicators that can be employed to represent the distribution of the ratings of a set of reviews. In some embodiments, the 1 to 5 scale depicted in FIG. 2 is associated with a five star rating system, with five stars corresponding to the highest rating and one star corresponding to the lowest rating. Graphic 202 may be used to indicate a mostly even distribution across all ratings, graphic 204 may be used to indicate a distribution associated with mostly high ratings (e.g., mostly positive reviews), graphic 206 may be used to indicate a distribution associated with mostly low ratings (e.g., mostly negative reviews), graphic 208 may be used to indicate a Gaussian distribution of the ratings, graphic 210 may be used to indicate a distribution associated with mostly median ratings, and graphic 212 may be used to indicate a mostly bipolar distribution of the ratings. In some embodiments, one or more values in a rating scale associated with a graphical indicator (e.g., 1-5 in the given example) may be associated with keywords selected to be associated with the set of reviews, so that, for example, the relevant keywords associated with various ratings can be concisely presented. Graphical indicators 202-212 provide some examples of the manners in which the distribution of ratings associated with a set of reviews may be graphically represented. Alternatively, the distribution of ratings associated with a set of reviews may be graphically represented in any other appropriate manner using any appropriate graphical indicator.

Figure 3A:
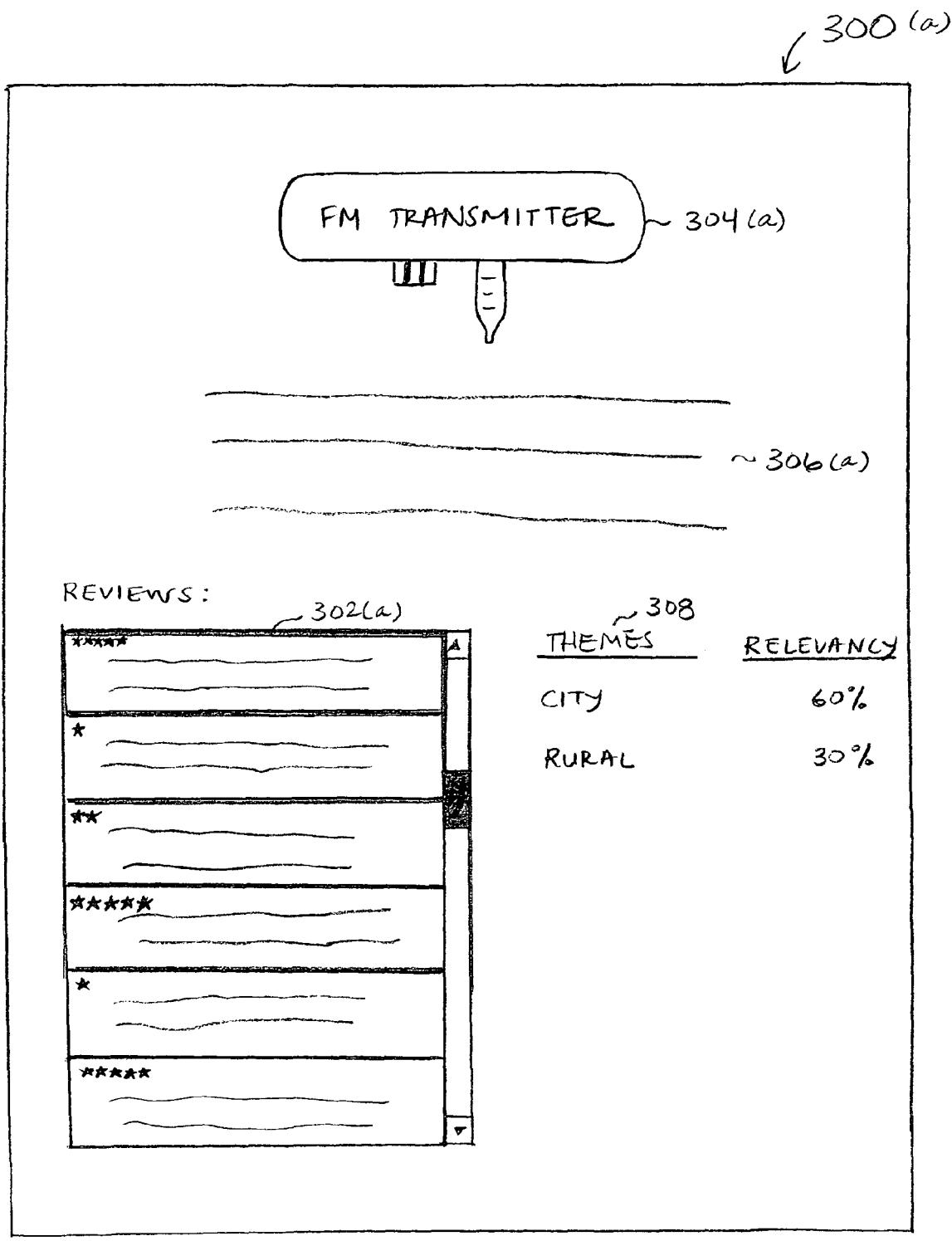
FIG. 3A illustrates an embodiment for presenting and/or summarizing the content of a set of reviews.
Figure 3B:
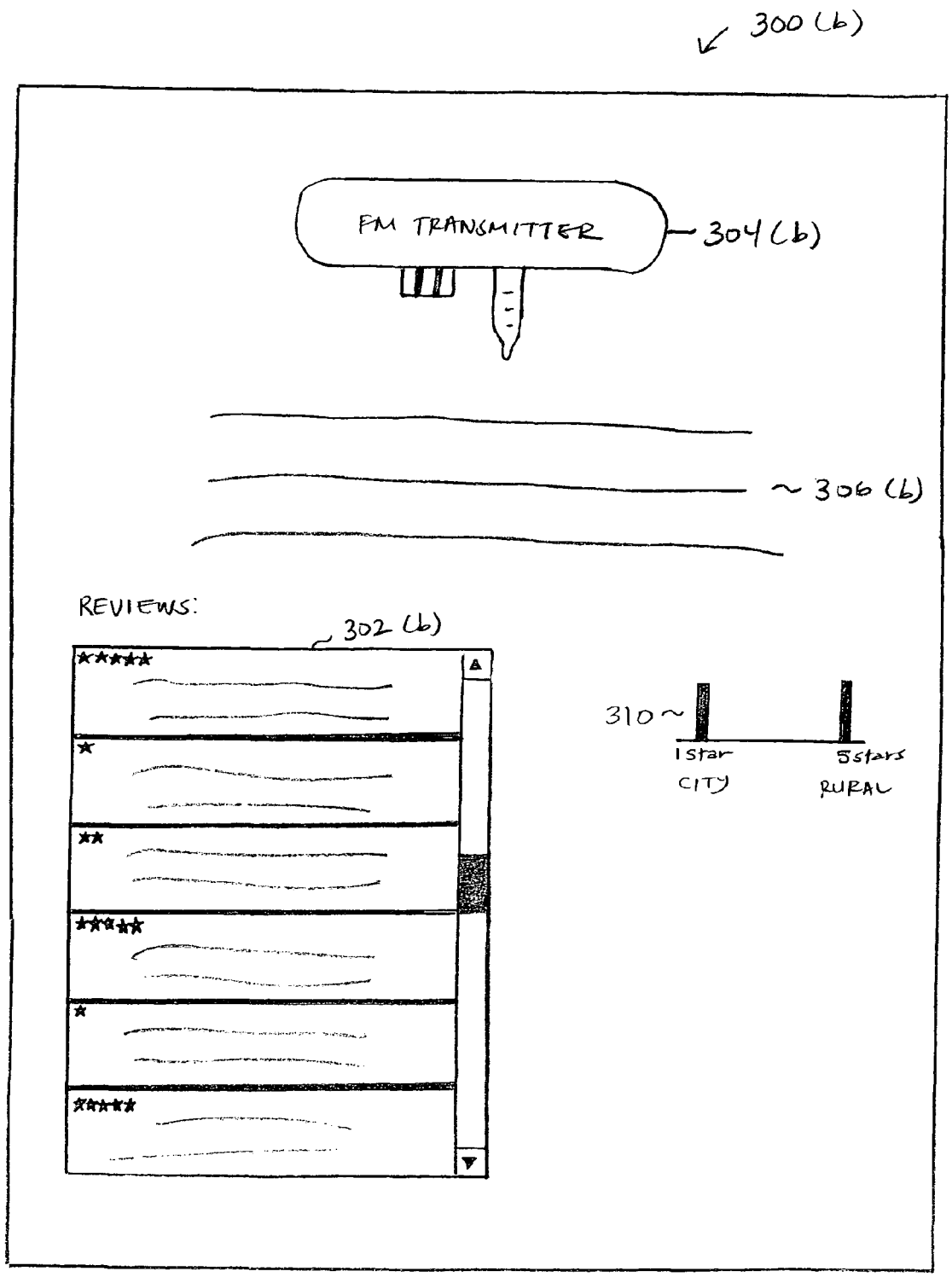
FIG. 3B illustrates an embodiment for presenting and/or summarizing the content of a set of reviews.

FIGS. 3A and 3B illustrate various embodiments for presenting and/or summarizing the content of a set of reviews. In the examples of FIGS. 3A and 3B, a set of reviews 302 (which could be 302(*a*) of FIG. 3A or 302(*b*) of FIG. 3B) is presented with respect to a product detail page 300 that may be available, for example, at an online store, manufacturer site, product review site, etc. In the given examples, product detail page 300 is associated with an FM transmitter 304 (which could be 304(a) of FIG. 3A or 304(b) of FIG. 3B) that can, for example, convert the output of an MP3 player into an FM radio signal that can be picked up and played back by any FM radio, such as a car radio. Product detail page 300 may include various types of information 306 about FM transmitter 304, such as associated features, potential uses, compatible MP3 players, price, etc., and/or may include one or more options 306 (which could be 306(a) of FIG. 3A or 306(b) of FIG. 3B), such as the option to select various configurations and/or options associated with FM transmitter 304, an option to buy FM transmitter 304, an option to review FM transmitter 304, etc. As depicted, product detail page 300 also includes a set of reviews 302 associated with FM transmitter 304, and each review in the set of reviews includes a reviewer specified star rating for FM transmitter 304. In various embodiments, the set of reviews 302 may be sorted chronologically, by ratings, by usefulness scores, by reviewer names, by topic, or any other appropriate manner, and a user may have the option to select the manner in which the set of reviews 302 is sorted.

In some embodiments, process 100 is employed to analyze the information included in and/or trends associated with the set of reviews 302 and present them in a concise manner. For example, the content of the set of reviews 302 may be parsed to extract one or more keywords to be included in a "themes" section 308 associated with the set of reviews 302. In the given examples, the keywords "city" and "rural" have been selected, for example, using process 100 of FIG. 1, to at least in part represent the content associated with the set of reviews 302. As depicted in the example of FIG. 3A, each keyword is associated with a percentage that specifies the percentage of reviews that include the corresponding keyword or a permutation of the keyword. In some embodiments, instead of and/or in addition to such a percentage, a keyword may be presented with a relevance score that may depend upon one or more factors such as the number of reviews that include the keyword or an associated permutation; the numbers of repetitions of the keyword or associated permutations in the reviews that include the keyword or associated permutations; if the keyword or associated permutations comprise multiple words, the spacing or distance of the words included in the keyword or associated permutations in the reviews that include the keyword or associated permutations; the usefulness scores associated with the reviews that include the keyword or associated permutations; etc. In some embodiments, instead of and/or in addition to presenting a percentage, relevance score, and/or other associated score with each keyword, the average rating associated with the subset of reviews that include the keyword is presented with the keyword. For instance, with respect to the example of FIG. 3A, an average star rating of one star may be associated with keyword "city" and an average star rating of five stars may be associated with keyword "rural". Such a bipolar distribution of the ratings for the FM transmitter 304 may result, for example, due to poor performance of the FM transmitter 304 in cities where interference problems may occur with the many FM radio stations in cities and excellent performance in rural areas where interference problems are not as prevalent. In some embodiments, one or more keywords selected to be associated with a set of reviews 302 of an item 304 are included in a set of tags associated with the item 304 and/or associated page 300 to categorize the item 304 and/or associated page 300 so that it can be indexed for future retrieval.

In some embodiments, each keyword is associated with a link which when selected directs a user to a subset of reviews in the set of reviews 302 that include the keyword or associated permutations. In various embodiments, a set of reviews 302 is categorized by one or more layers of keywords. In some embodiments, clicking on a link associated with a keyword directs a user to a set of other keywords hierarchically categorized under the keyword. For example, clicking on a link associated with keyword "city" may result in keywords such as "US" and "Europe" to be presented which facilitate more specific direction to a subset of reviews. Although in the given examples two keywords have been extracted and presented to categorize and summarize the content of the set of reviews 302, in other embodiments, any number of keywords may be presented and may be sorted for presentation in any appropriate manner, e.g., alphabetically, from highest to lowest relevancy, etc. The categorization of the set of reviews 302 aids a user in finding the reviews of interest to the user, i.e. the reviews that include topics that are of interest to the user. Such a categorization is especially useful when niche keywords that are only included in a small percentage of the total reviews are presented and may be used to navigate to the corresponding subsets of reviews so that a user does not have to sift through a large number of reviews to find the few reviews that are of interest to the user. In some embodiments, users considering the set of reviews 302 may have the option to vote on the usefulness of one or more keywords presented with the set of reviews 302. Such user supplied usefulness scores of keywords may be employed in the selection of keywords to be presented, may be included with the keywords so that users considering the set of reviews 302 can gain a sense of which keywords other users found useful, may be used to sort the keywords, etc.

In some embodiments, the distribution of the ratings associated with a set of reviews is graphically presented as depicted in FIG. 3B. In the given example, since the ratings of the reviews in the set of reviews 302 are at least for the most part either one star or five stars, a bipolar distribution 310 is selected to represent the distribution of the ratings. Optionally, in some embodiments, if the set of reviews 302 has been categorized into one or more associated keywords, such as depicted in FIG. 3A, one or more of such keywords may be correlated with the ratings of the associated reviews. As depicted in FIG. 3B, the keyword "city" is correlated to a rating of one star, for example, because at least most of the reviews that include the keyword "city" are rated one star; and the keyword "rural" is correlated to a rating of five stars, for example, because at least most of the reviews that include the keyword "rural" are rated five stars.

In some embodiments, trend information is determined, e.g., based on respective dates associated with reviews comprising the set of reviews. If more recent reviews are determined to express as a group a different range and/or distribution of opinion than older reviews, for example, in some embodiments a first visual indication of the range and distribution of older reviews is displayed along with a second visual indication of the range and distribution of more recent reviews, to enable a user to get a sense quickly of any trends (e.g., early reviews were mostly favorable, but more recent reviews more negative, which may reveal, for example, changing tastes and/or poor reliability over time). In some embodiments, trends are determined and a visual indication of such trends (e.g., a downward arrow or slope, in the preceding example) is displayed.

In some embodiments, users considering the set of reviews 302 may have the option to vote on the usefulness of a graphical distribution of ratings 310 presented with the set of reviews 302. Such user supplied usefulness scores of a graphical distribution may be presented with the graphical distribution so that users can gain a sense of how useful other users found the graphical representation. In various embodiments, one or more of a "hot topics" section 308 and a graphical distribution 310 are presented with a set of reviews 302, for example, to help a user navigate the set of reviews 302 and/or gain a sense of the topics, themes, trends, view points, and/or ratings associated with the set of reviews 302. Alternatively, any other appropriate techniques or combinations of techniques may be employed to concisely present such information to a user interested in a set of reviews.

The techniques described herein enable a user to get a sense quickly of the content and/or range and distribution of views expressed in a set of reviews. In the example shown in FIGS. 3A and 3B, for example, a rural user could determine relatively quickly that people either seem to love or hate the FM transmitter product, and that the user is more like the reviewers that liked the product than those that hated it. A body of information that otherwise may not have seemed to provide any clear guidance becomes more accessible and useful in making a purchase or other decision.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for summarizing a set of reviews, comprising:
    extracting a plurality of keywords from a set of reviews that are associated with a product, each review containing content expressing opinions of the product, wherein the plurality of keywords are selected from the content based on a relevance score of multiple tuples of words in the content, wherein the multiple tuples include various permutations of the same root words, and wherein the relevance score is based on the spacing between two words in each tuple in the multiple tuples;
    selecting a subset of reviews from the set of reviews, each review in the subset of reviews containing a keyword from the plurality of keywords;
    generating a keyword rating value based on the content belonging to the subset of reviews; and
    presenting a summary of the set of reviews, the summary being configured to graphically display the keyword and the corresponding keyword rating value along with another keyword and another corresponding keyword rating value simultaneously.

2. The computer-implemented method of claim 1, wherein the content includes a reviewer-specified rating value rating the product and wherein generating the keyword rating value further comprises calculating the average or median of the reviewer-specified rating value belonging to each review in the subset of reviews.

3. The computer-implemented method of claim 1, wherein the tuples of words are segments of the content that do not contain a word from a predefined stop list of words.

4. The computer-implemented method of claim 1, wherein the relevance score indicates a degree of relevance of the keyword to the set of reviews.

5. The computer-implemented method of claim 1, wherein a user to whom the summary is presented is provided an opportunity to vote on a usefulness of the summary.

6. The computer-implemented method of claim 1, wherein the set of reviews is hierarchically categorized by the plurality of keywords to result in at least each of the one or more keywords being associated with a subset of the set of reviews.

7. The computer-implemented method of claim 1, wherein at least one of the plurality of keywords comprises a link which when selected directs to a set of one or more other keywords hierarchically categorized under that keyword.

8. A system for summarizing a set of reviews, comprising:
    a processor configured to:
        extract a plurality of keywords from a set of reviews that are associated with a product, each review containing content expressing opinions of the product, wherein the plurality of keywords are selected from the content based on a relevance score of tuples of words in the content, wherein the multiple tuples include various permutations of the same root words, and wherein the relevance score is based on the spacing between two words in each tuple in the multiple tuples;
        select a subset of reviews from the set of reviews, each review in the subset of reviews containing a keyword from the plurality of keywords;
        generate a keyword rating value based on the content belonging to the subset of reviews; and
        present a summary of the set of reviews, the summary being configured to graphically display the keyword and the corresponding keyword rating value along with another keyword and another corresponding keyword rating value simultaneously; and
    a memory coupled to the processor and configured to provide instructions to the processor.

9. The system of claim 8, wherein the content includes a reviewer-specified rating value rating the product and wherein generating the keyword rating value further comprises calculating the average or median of the reviewer-specified rating value belonging to each review in the subset of reviews.

10. The system of claim 8, wherein the tuples of words are segments of the content that do not contain a word from a predefined stop list of words.

11. The system of claim 8, wherein the relevance score indicates a degree of relevance of the keyword to the set of reviews.

12. The system of claim 8, wherein a user to whom the summary is presented is provided an opportunity to vote on a usefulness of the summary.

13. The system of claim 8, wherein the set of reviews is hierarchically categorized by the plurality of keywords to result in at least each of the one or more keywords being associated with a subset of the set of reviews.

14. The system of claim 8, wherein at least one of the plurality of keywords comprises a link which when selected directs to a set of one or more other keywords hierarchically categorized under that keyword.

15. A computer program product for summarizing a set of reviews, the computer program product being embodied in a non-transitory computer readable storage medium and comprising computer instructions for:
    extracting a plurality of keywords from a set of reviews that are associated with a product, each review containing content expressing opinions of the product, wherein the plurality of keywords are selected from the content based on a relevance score of tuples of words in the content, wherein the multiple tuples include various permutations of the same root words, and wherein the relevance score is based on the spacing between two words in each tuple in the multiple tuples;

selecting a subset of reviews from the set of reviews, each review in the subset of reviews containing a keyword from the plurality of keywords;

generating a keyword rating value based on the content belonging to the subset of reviews; and presenting a summary of the set of reviews, the summary being configured to graphically display the keyword and the corresponding keyword rating value along with another keyword and another corresponding keyword rating value simultaneously.

16. The computer program product of claim 15, wherein the content includes a reviewer-specified rating value rating the product and wherein generating the keyword rating value further comprises calculating the average or median of the reviewer-specified rating value belonging to each review in the subset of reviews.

17. The computer program product of claim 15, wherein the tuples of words are segments of the content that do not contain a word from a predefined stop list of words.

18. The computer program product of claim 15, wherein the relevance score indicates a degree of relevance of the keyword to the set of reviews.

19. The computer program product of claim 15, wherein a user to whom the summary is presented is provided an opportunity to vote on a usefulness of the summary.

20. The computer program product of claim 15, wherein the set of reviews is hierarchically categorized by the plurality of keywords to result in at least each of the one or more keywords being associated with a subset of the set of reviews.

21. The computer program product of claim 15, wherein at least one of the plurality of keywords comprises a link which when selected directs to a set of one or more other keywords hierarchically categorized under that keyword.

* * * * *